US006745297B2

(12) United States Patent
Kruckemyer et al.

(10) Patent No.: US 6,745,297 B2
(45) Date of Patent: Jun. 1, 2004

(54) CACHE COHERENT PROTOCOL IN WHICH EXCLUSIVE AND MODIFIED DATA IS TRANSFERRED TO REQUESTING AGENT FROM SNOOPING AGENT

(75) Inventors: David A. Kruckemyer, Mountain View, CA (US); Joseph B. Rowlands, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 373 days.

(21) Appl. No.: 09/829,514

(22) Filed: Apr. 9, 2001

(65) Prior Publication Data

US 2002/0147889 A1 Oct. 10, 2002

Related U.S. Application Data

(60) Provisional application No. 60/238,800, filed on Oct. 6, 2000.

(51) Int. Cl.$^7$ .............................................. G06F 13/00
(52) U.S. Cl. ..................... 711/145; 711/144; 711/146
(58) Field of Search .............................. 711/145, 144, 711/146, 141, 155, 140

(56) References Cited

U.S. PATENT DOCUMENTS

| 5,522,057 | A | * | 5/1996 | Lichy ......................... 711/144 |
| 5,572,703 | A | * | 11/1996 | MacWilliams et al. ..... 711/146 |
| 5,761,721 | A | * | 6/1998 | Baldus et al. ................ 711/141 |
| 5,765,199 | A | * | 6/1998 | Chang et al. ................ 711/168 |
| 5,797,026 | A | * | 8/1998 | Rhodehamel et al. .......... 712/1 |
| 5,890,200 | A | * | 3/1999 | Merchant ..................... 711/108 |
| 5,909,699 | A | * | 6/1999 | Sarangdhar et al. ........ 711/146 |
| 6,052,760 | A | * | 4/2000 | Bauman et al. ............. 711/119 |
| 6,098,156 | A | * | 8/2000 | Lenk .......................... 711/146 |
| 6,134,635 | A | * | 10/2000 | Reams ........................ 711/150 |
| 6,138,218 | A | | 10/2000 | Arimilli et al. |
| 6,378,048 | B1 | * | 4/2002 | Prudvi et al. ................ 711/144 |
| 6,438,660 | B1 | * | 8/2002 | Reams ........................ 711/143 |
| 6,460,119 | B1 | * | 10/2002 | Bachand et al. ............. 711/146 |
| 6,519,685 | B1 | * | 2/2003 | Chang ........................ 711/141 |

OTHER PUBLICATIONS

Patterson and Hennessy, "Computer Architecture a Quantitative Approach," Morgan Kaufmann Publishers, Inc. 1990, pp. 467–474.

* cited by examiner

Primary Examiner—Hong Kim
(74) Attorney, Agent, or Firm—Lawrence J. Merkel

(57) ABSTRACT

A system may include two or more agents, at least some of which may cache data. In response to a read transaction, a caching agent may snoop its cached data and provide a response in a response phase of the transaction. Particularly, the response may include an exclusive indication used to represent both exclusive and modified states within that agent. In one embodiment, the agent responding exclusive may be responsible for providing the data for a read transaction, and may transmit an indication of which of the exclusive or modified state that agent had the data in concurrent with transmitting the data.

42 Claims, 9 Drawing Sheets

CACHE COHERENT PROTOCOL IN WHICH EXCLUSIVE AND MODIFIED DATA IS TRANSFERRED TO REQUESTING AGENT FROM SNOOPING AGENT

This application claims benefit of priority to provisional application Serial No. 60/238,800 filed Oct. 6, 2000.

BACKGROUND OF THE INVENTION

1. Field of the Invention

This invention is related to the field of digital systems and, more particularly, to maintaining cache coherency in such systems.

2. Description of the Related Art

A bus is frequently used in digital systems to interconnect a variety of devices included in the digital system. Generally, one or more devices are connected to the bus, and use the bus to communicate with other devices connected to the bus. As used herein, the term "agent" refers to a device which is capable of communicating on the bus. The agent may be a requesting agent if the agent is capable of initiating transactions on the bus and may be a responding agent if the agent is capable of responding to a transaction initiated by a requesting agent. A given agent may be capable of being both a requesting agent and a responding agent. Additionally, a "transaction" is a communication on the bus. The transaction may include an address transfer and optionally a data transfer. Transactions may be read transactions (transfers of data from the responding agent to the requesting agent) and write transactions (transfers of data from the requesting agent to the responding agent). Transactions may further include various coherency commands which may or may not involve a transfer of data.

A feature of many buses is a coherency protocol. The protocol is used by agents to ensure that transactions are performed in a coherent manner. More particularly, the coherency protocol is used, when one or more agents may cache data corresponding to a memory location, to ensure that cached copies and the memory location are updated to reflect the effect of various transactions which may be performed by various agents.

In some cases, coherency may be maintained via a snooping process in which each agent which may cache data may search its caches for a copy of the data affected by the transaction, as well as the state that the copy is in. As used herein, the "state" of a cached copy of data may indicate a level of ownership of the data by the caching agent. The level of ownership indicates what operations are permissible on the cached copy. For example, a read of the cached copy may generally be permissible with any level of ownership other than no ownership (i.e. no cached copy is stored). A write may be permissible for levels of ownership which indicate that no other cached copies exist. An exemplary set of states may be the Modified, Exclusive, Shared, and Invalid (MESI) states or the MOESI states (including the MESI states and an owned state). Caching agents may report, using the coherency protocol, the state of the data within that agent. Based on the states reported using the coherency protocol, each agent may determine the action to take to update its state for the data being accessed by the transaction.

It is desirable for the state of the cached copy to be reported as soon as possible. Delayed reporting of the state may result in increased latency for the transaction. Furthermore, the amount of delay from initiating the transaction to reporting the state of the data affected by the transaction may make the coherency mechanism more complex. Unfortunately, it may be difficult to determine the exact state of the data quickly. Furthermore, to determine the exact state of the data may require intrusive changes to caches within the agent and/or to circuitry that interfaces with the caches.

SUMMARY OF THE INVENTION

The problems outlined above are in large part solved by a system as described herein. The system may include two or more agents, at least some of which may cache data. In response to a transaction, a caching agent may snoop its cached data and provide a response in a response phase of the transaction. Particularly, the response may include an exclusive indication used to represent both exclusive and modified states within that agent. In one embodiment, the agent responding exclusive may be responsible for providing the data for a read transaction, and may transmit an indication of which of the exclusive or modified state that agent had the data in concurrent with transmitting the data. Thus, the caching agents may defer determining which of the exclusive state or the modified state that agent has the data in. Snooping hardware may be simplified, and may allow for a rapid snoop response.

In one embodiment, the bus on which transactions are transmitted is a split transaction bus in which the data bus is separately arbitrated for by the responding agent. In the case of an exclusive snoop hit for a read, the responding agent may be the agent that responded exclusive. Thus, the responding agent may control when the data is provided, and thus the agents may have flexibility in responding to exclusive snoop hits. This flexibility may be used to provide a relatively nonintrusive mechanism for fetching data and performing snoop updates within the agent.

In another embodiment of the system, the caching agent may provide a modified response in the response phase if the data is in the modified state at the time of the snoop (as well as an exclusive response if the data is in the exclusive state at the time of the snoop), but may provide the data for a read transaction if the response is either exclusive or modified. Such an implementation may allow for the caching agent to modify the data prior to providing the data, even if the data is in the exclusive state at the time of the snoop. The mechanism for fetching the data within the agent may be made relatively nonintrusive. For example, the mechanism may not block in-flight stores from modifying exclusive data before the data is fetched from the data cache (and the state changed in the data cache), even if a response of exclusive has already been given for the transaction. The caching agent may indicate that the data is modified when providing the data, if the data was modified between the snoop and the transmission of the data.

Broadly speaking, a system is contemplated. The system comprises a first agent configured to transmit an address of a transaction, and a second agent coupled to receive the address. The second agent is configured to transmit an indication of a state, within the second agent, of data corresponding to the address. The indication indicates an exclusive state for both the exclusive state and a modified state of the data within the second agent.

Additionally, a second system is contemplated comprising a first agent configured to transmit an address of a read transaction, and a second agent coupled to receive the address. The second agent is configured to provide data corresponding to the address to the first agent responsive to the second agent having the data in an exclusive state.

Moreover, an agent is contemplated. The agent comprises a storage configured to store state information indicative of a state of data stored within the agent, and a circuit coupled to the storage and to receive an address of a transaction. The circuit is configured to generate an indication of a state of data corresponding to the address responsive to the state information in the storage. The indication indicates an exclusive state for both an exclusive state within the agent and a modified state within the agent.

Still further, a second agent is contemplated. The agent includes a data cache configured to store data in a plurality of states including an exclusive state and a modified state, and a circuit coupled to the data cache. The circuit is configured to retrieve first data from the data cache and to provide the first data in response to a read transaction operating on the first data if the first data is in the exclusive state.

Furthermore, a method is contemplated. An address of a transaction is received in an agent. The agent responds during a response phase of the transaction with an exclusive state for both the exclusive state and a modified state of data corresponding to the address within the agent.

Additionally, another method is contemplated. An address of a read transaction is received in a agent. Data is transmitted from the agent for the transaction responsive to the agent having the data in an exclusive state.

BRIEF DESCRIPTION OF THE DRAWINGS

Other objects and advantages of the invention will become apparent upon reading the following detailed description and upon reference to the accompanying drawings in which.

Figure 1:
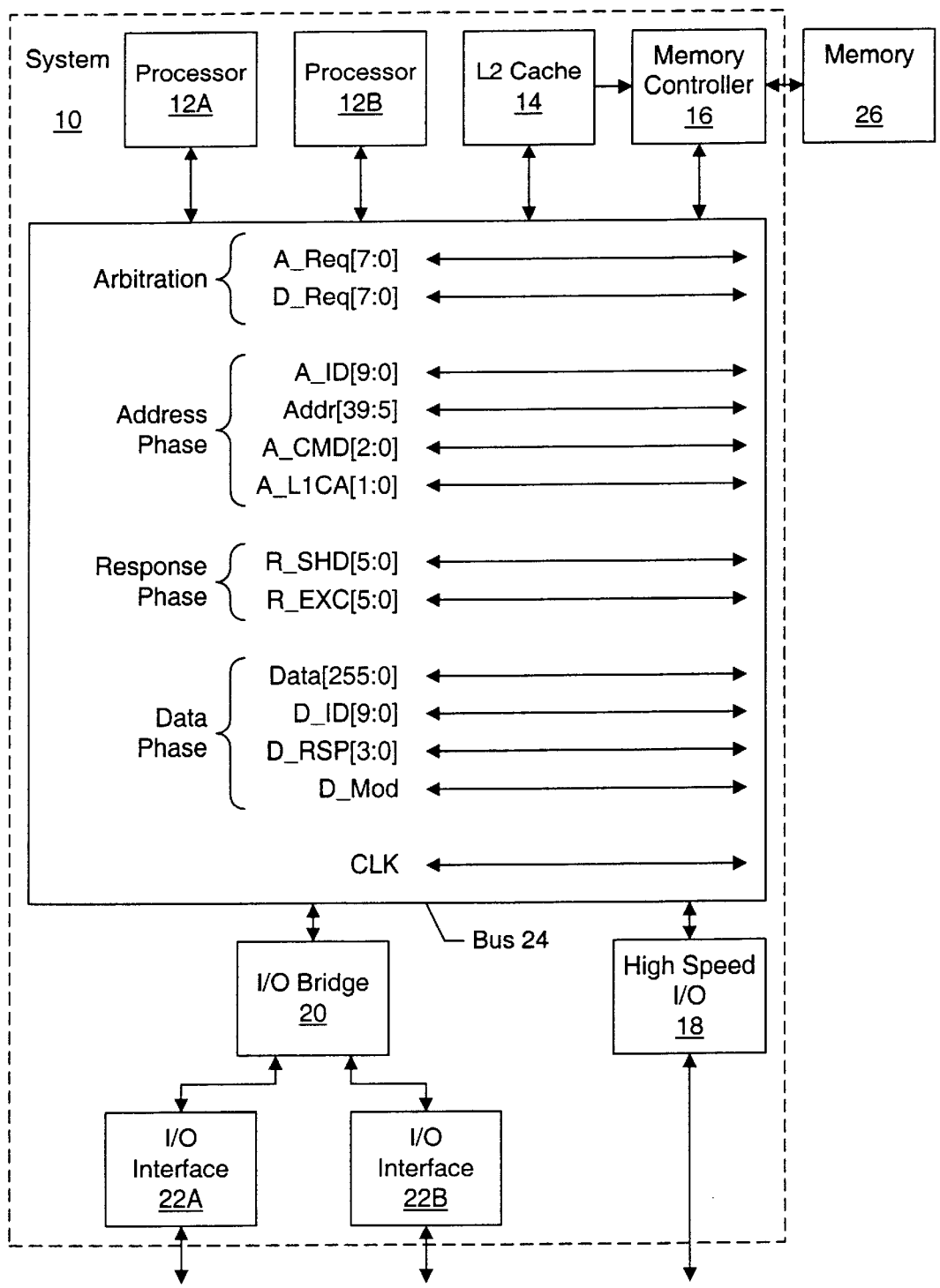
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a high speed input/output (I/O) bridge 18, an I/O bridge 20, and I/O interfaces 22A–22B. System 10 may include a bus 24 for interconnecting the various components of system 10. As illustrated in FIG. 1, each of processors 12A–12B, L2 cache 14, memory controller 16, high speed I/O bridge 18 and I/O bridge 20 are coupled to bus 24. I/O bridge 20 is coupled to I/O interfaces 22A–22B. L2 cache 14 is coupled to memory controller 16, which is further coupled to a memory 26.

Bus 24 may be a split transaction bus in the illustrated embodiment. A split transaction bus splits the address and data portions of each transaction and allows the address portion (referred to as the address phase) and the data portion (referred to as the data phase) to proceed independently. In the illustrated embodiment, the address bus and data bus are independently arbitrated for, allowing for out of order data phases with respect to the corresponding address phases. Each transaction including both address and data thus includes an arbitration for the address bus, an address phase, an arbitration for the data bus, and a data phase. Additionally, coherent transactions may include a response phase for communicating coherency information after the address phase.

Various signals included in bus 24 are illustrated in FIG. 1, including arbitration signals, address phase signals, response phase signals, and data phase signals. The arbitration signals include a set of address request signals (A_Req[7:0]) used by each requesting agent to arbitrate for the address bus and a set of data request signals (D_Req[7:0]) used by each responding agent to arbitrate for the data bus. The address phase signals include an address bus used to provide the address of the transaction (Addr[39:5]), a command (A_CMD[2:0]) used to indicate the transaction to be performed (read, write, etc.), a transaction ID (A_ID[9:0]) used to identify the transaction, and a cache attributes (A_L1CA[1:0]). More particularly, the transaction ID may be used for read and write transactions to match the address phase with the subsequent data phase of the transaction. A portion of the transaction ID is an agent identifier identifying the requesting agent. For example, the agent identifier may be bits 9:6 of the transaction ID. Each agent is assigned a different agent identifier. The cache attributes may include a cacheability indicator indicating whether or not the transaction is cacheable within the initiating agent and a coherency indicator indicating whether or not the transaction is to be performed coherently. The response phase signals include a set of shared signals (R_SHD[5:0]) and a set of exclusive signals (R_EXC[5:0]). Each agent which participates in coherency may be assigned a corresponding one of the set of shared signals and a corresponding one of the set of exclusive signals. The data phase signals include a data bus (Data[255:0]), a transaction ID (D_ID[9:0]) similar to the transaction ID of the address phase and used to match the address phase with the corresponding data phase, a responder ID (D_RSP[3:0]), and a modified signal (D_Mod). The responder ID is the agent identifier of the responding agent who arbitrated for the data bus to perform the data transfer. Additionally, bus 24 includes a clock signal (CLK) which carries a clock to which the bus signals are referenced. Both the address phase and the data phase may include other signals, as desired, such as the L2 cacheability of a transaction in the address phase and data error signals in the data phase.

Generally, if an agent initiates a coherent transaction, each agent which participates in coherency (a "snooping agent")

responds to the transaction in the response phase. Each snooping agent is assigned a shared signal and an exclusive signal, and drives an indication of the state of the data affected by the transaction on its assigned signals. For example, in one embodiment, processors 12A–12B may be capable of caching data in L1 data caches therein. Additionally, I/O bridges 18 and 20 may be capable of caching data (e.g. caching a cache line into which DMA write data is to be merged upon receipt from an I/O device). Thus, each of processors 12A–12B and I/O bridges 18 and 20 are assigned separate shared and exclusive signals. It is noted that, while L2 cache 14 is capable of caching data, L2 cache 14 may be a low latency cache for memory 26 (as opposed to a cache dedicated to another agent). Thus, L2 cache 14 may be a part of the memory system along with memory controller 16 and memory 26. If data is stored in L2 cache 14, L2 cache 14 responds to the transaction instead of memory controller 16 and thus there is no coherency issue between L2 cache 14 and memory 26 for this embodiment.

Each snooping agent determines a state of the data affected by the transaction. In one embodiment, for example, the MESI states are employed. The modified state indicates that no other snooping agent has a copy of the data and that the data is modified with respect to the copy in the memory system (L2 cache 14 and/or memory 26). The exclusive state indicates that no other snooping agent has a copy of the data and that the data is not modified with respect to the copy in the memory system. The shared state indicates that one or more other snooping agents may have a copy of the data. The invalid state indicates that the snooping agent does not have a copy of the data. Other sets of states are possible and contemplated, including the MOESI states (which include the MESI states as well as an owned state in which the data may be shared with one or more other agents but may be modified with respect to the copy in the memory system and thus may be copied back to the memory system when the owning agent evicts the data) or any other set of states. Other embodiments may employ any suitable subset of the MESI or MOESI states (e.g. ESI, MSI, MOSI, etc.). It is noted that the granularity on which snooping is performed may vary from embodiment to embodiment. Some embodiments may perform snooping on a cache line granularity, while other embodiments may perform snooping on a partial cache line (e.g. sector) granularity, or a multiple cache line granularity.

For an embodiment employing the MESI states, an agent signals the invalid state by deasserting both the shared and exclusive signals. The agent signals the shared state by asserting the shared signal and deasserting the exclusive signal. The agent signals the exclusive state by asserting the exclusive signal and deasserting the shared signal. If the agent has the data in the modified state, the agent also asserts the exclusive signal and deasserts the shared signal. Thus, for snooping purposes, exclusive and modified may be treated as the same state. For an embodiment employing the MOESI states, the owned state may be signalled as exclusive as well.

Since the agent signals the exclusive and modified states in the same fashion, and since the modified state includes having the data exclusively, the agent need not determine the exact state of the data between exclusive and modified. Instead, it may be sufficient for the agent to determine if it is caching the data and whether it is shared or exclusive. Thus, snooping may be simplified.

An agent having the exclusive or modified state for the data affected by a transaction (and thus responded in the responsive phase by asserting the exclusive signal) may be responsible for providing the data for that transaction (if the transaction is a read). Thus, L2 cache 14 and memory controller 16 may receive the exclusive signals, and may not provide the data for the read transaction if an exclusive signal is asserted. The agent responding exclusive may retrieve the data from its cache or other storage, arbitrate for the data bus, and transmit the data as the data phase of the transaction. Additionally, concurrent with the transmission of the data, the agent may indicate whether the state is exclusive or modified using the D_Mod signal. More particularly, the D_Mod signal may be asserted to indicate the modified state and deasserted to indicate the exclusive state. Thus, the correct state of the data (for an exclusive response) is communicated to the system during the data phase.

In one embodiment, bus 24 supports two types of read transactions: read nonexclusive and read exclusive. The term "read transactions" is used to generically mean any read, and read non-exclusive and read exclusive are used for each type of read. A read non-exclusive is a read transaction performed by an agent which can accept the data as either shared or exclusive, based on the response phase of the transaction. A read exclusive transaction is a read transaction which is defined to result in the requesting agent caching the data in an exclusive state.

Each requesting agent receives the exclusive and shared signals from each snooping agent. Thus, the requesting agent for a transaction may determine an appropriate state for the data received in response to the transaction, and may cache the data in that state. For example, if the transaction is a read non-exclusive and either a shared or exclusive signal is asserted, the data may be cached by the requesting agent in the shared state. If the transaction is a read non-exclusive and neither a shared nor an exclusive signal is asserted, the data may be cached by the requesting agent in the exclusive state. If the transaction is a read exclusive transaction, the data may be cached in the exclusive state regardless of the signals. However, the exclusive signals may still be used by the memory system to inhibit providing data for the transaction if exclusive is signalled.

In the illustrated embodiment, system 10 employs a distributed arbitration scheme, and thus each requesting agent is assigned an address request signal (one of A_Req[7:0]), and each responding agent is assigned a data request signal (D_Req[7:0]). More particularly, as mentioned above, each agent is assigned an agent identifier and the corresponding address request signal and/or data request signal may be used by that agent.

The fairness scheme implemented by one embodiment of system 10 may be one in which the agent granted the bus is made lowest priority for being granted the bus again. The highest priority agent which is requesting the bus is granted the bus. Since address and data buses are separately arbitrated, separate priority states are maintained for the address and data buses.

Each agent may include an address arbiter coupled to receive at least the address request signals (A_Req[7:0]) corresponding to each other requesting agent besides the requesting agent to which that address arbiter corresponds (the "corresponding agent"). The address arbiter tracks which of the agents are higher priority than the corresponding agent and which agents are lower priority than the corresponding agent for address bus arbitration. Thus, given the request signals from each other agent, the address arbiter can determine whether or not the corresponding agent wins the arbitration for the address bus. The address arbiter uses the agent identifier (A_ID[9:6]) in the address phase of the transaction performed by the arbitration winner to update the priority state for the corresponding agent. More particularly, the agent which won the arbitration is marked as lower priority than the corresponding agent. On the other hand, if the corresponding agent does win the arbitration, the address arbiter updates the priority state to indicate that each other agent is higher priority than the corresponding agent. The data arbiter in each responding agent may operate similarly with respect to the data request signals (D_Req[7:0]) and the agent identifier (D_RSP[3:0]) in the data phase of a transaction.

Bus 24 may be pipelined. Bus 24 may employ any suitable signalling technique. For example, in one embodiment, differential signalling may be used for high speed signal transmission. Other embodiments may employ any other signalling technique (e.g. TTL, CMOS, GTL, HSTL, etc.).

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

L2 cache 14 is a high speed cache memory. L2 cache 14 is referred to as "L2" since processors 12A–12B may employ internal level 1 ("L1") caches. If L1 caches are not included in processors 12A–12B, L2 cache 14 may be an L1 cache. Furthermore, if multiple levels of caching are included in processors 12A–12B, L2 cache 14 may be a lower level cache than L2. L2 cache 14 may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that entry. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 26 in response to memory transactions received on bus 24. Memory controller 16 receives a hit signal from L2 cache 14, and if a hit is detected in L2 cache 14 for a memory transaction, memory controller 16 does not respond to that memory transaction. If a miss is detected by L2 cache 14, or the memory transaction is non-cacheable, memory controller 16 may access memory 26 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

High speed I/O bridge 18 may be an interface to a high speed I/O interconnect. For example, high speed I/O bridge 18 may implement the Lightning Data Transport (LDT) I/O fabric developed by Advanced Micro Devices, Inc. Other high speed interfaces may be alternatively used.

I/O bridge 20 is used to link one or more I/O interfaces (e.g. I/O interfaces 22A–22B) to bus 24. I/O bridge 20 may serve to reduce the electrical loading on bus 24 if more than one I/O interface 22A–22B is bridged by I/O bridge 20. Generally, I/O bridge 20 performs transactions on bus 24 on behalf of I/O interfaces 22A–22B and relays transactions targeted at an I/O interface 22A–22B from bus 24 to that I/O interface 22A–22B. I/O interfaces 22A–22B may be lower bandwidth, higher latency interfaces. For example, I/O interfaces 22A–22B may include one or more serial interfaces, Personal Computer Memory Card International Association (PCMCIA) interfaces, Ethernet interfaces (e.g. media access control level interfaces), Peripheral Component Interconnect (PCI) interfaces, etc.

It is noted that system 10 (and more particularly processors 12A–12B, L2 cache 14, memory controller 16, I/O interfaces 22A–22B, I/O bridge 20, I/O bridge 18 and bus 24 may be integrated onto a single integrated circuit as a system on a chip configuration. In another configuration, memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Additionally, other embodiments may use a central arbitration scheme instead of a distributed arbitration scheme.

It is noted that, while various bit ranges for signals are illustrated in FIG. 1 and other figures below, the bit ranges may be varied in other embodiments. The number of request signals, the size of the agent identifier and transaction ID, the size of the address bus, the size of the data bus, etc., may all be varied according to design choice.

It is noted that, while the illustrated embodiment includes a signal indicating whether transactions are coherent or not, other embodiments may treat all transactions as coherent. Additionally, while the present embodiment provides for separate shared and exclusive signals for each agent capable of caching data, other embodiments may employ a single shared signal and a single exclusive signal. Each agent capable of caching data may be coupled to the shared and exclusive signal, and may assert the signal as needed to indicate that state of the affected data. Furthermore, other embodiments may used different signal encodings than a shared and exclusive signal.

It is noted that, while the memory system (L2 cache 14 and memory controller 16) is described as updating data which is indicated as modified using the D_Mod signal during the data phase, other embodiments may not have the memory system update the data. Instead, the requesting agent could cache the data in the modified state, if desired.

Figure 2:
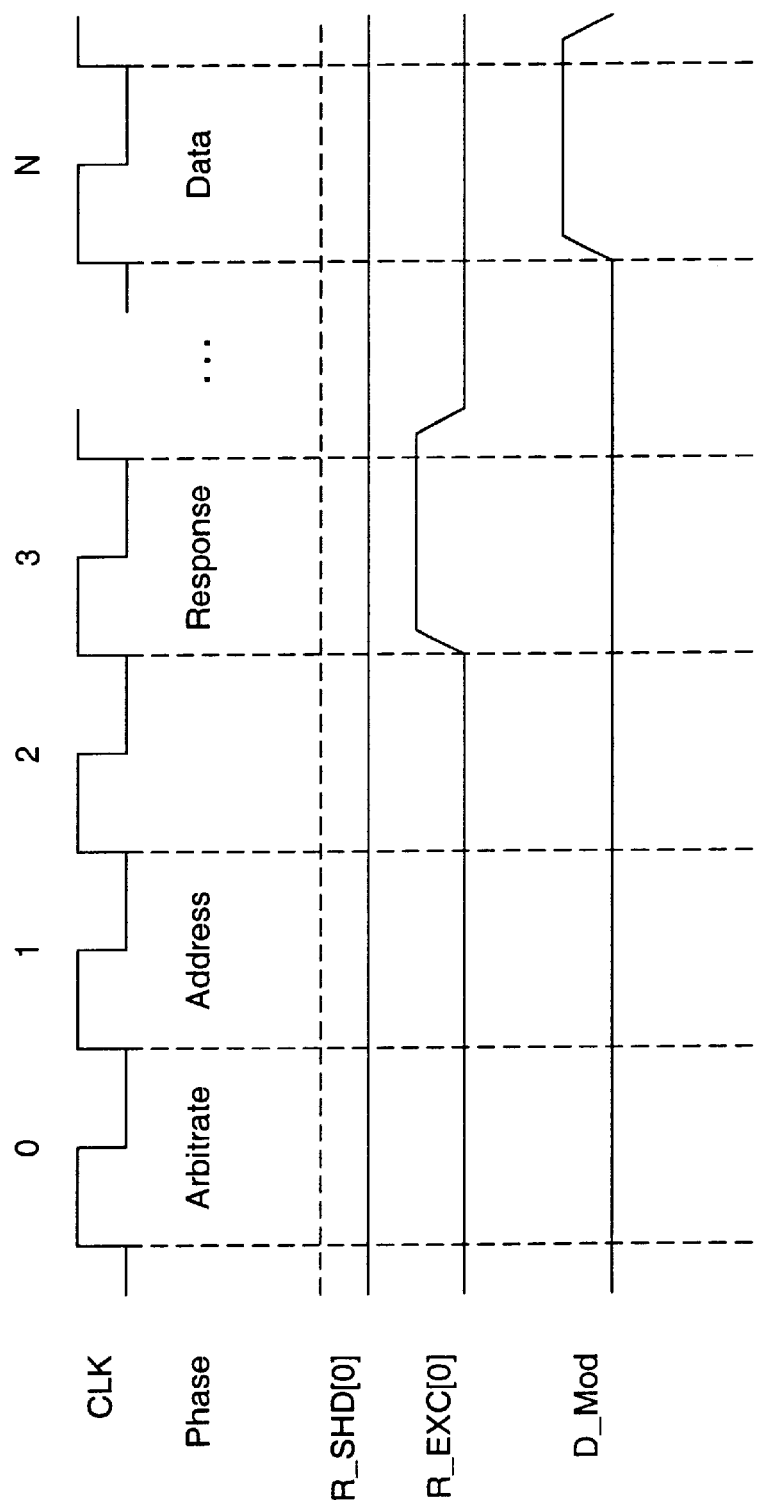
FIG. 2 is a timing diagram of a transaction according to one embodiment of the system shown in FIG. 1.

Turning next to FIG. 2, a timing diagram is shown illustrating an exemplary read transaction according to one embodiment of bus 24. Other embodiments are possible and contemplated. In FIG. 2, clock cycles are delimited by vertical dashed lines. Each clock cycle is labeled at the top (0, 1, 2, 3, and N). The clock cycles illustrated in FIG. 2 are periods of the CLK clock signal which clocks bus 24.

The phases of the exemplary transaction are illustrated in FIG. 2. During clock cycle 0, the requesting agent for the transaction participates in an arbitration and wins the arbitration. During clock cycle 1, the requesting agent transmits the address phase of the transaction, including the address, command, etc. shown in FIG. 1. The transaction may be indicated to be a coherent transaction on the A_L1CA[1:0] signals. During clock cycle 2, no phases of the transaction occur. During clock cycle 3, the response phase of the transaction occurs. For the exemplary transaction, the snooping agent assigned R_SHD[0] and R_EXC[0] detects an exclusive state for the cache line affected by the transaction, and thus deasserts the R_SHD[0] signal and asserts the R_EXC[0] signal. Since the snooping agent asserted the exclusive signal, the snooping agent provides the data in the data phase (clock cycle N). Additionally, the snooping agent concurrently indicates whether the data is exclusive or modified during clock cycle N. In the example, the snooping agent asserts the D_Mod signal, indicating that the data is modified. If the data were exclusive, the snooping agent would deassert the D_Mod signal during clock cycle N.

Transactions in which the snooping agent does not detect exclusive may be similar, except that the exclusive signal may be deasserted in clock cycle 3. The shared signal may be asserted if the data is in the shared state, or deasserted if the data is in the invalid state.

As FIG. 2 illustrates, the response phase may occur relatively quickly, but the data phase may be delayed by some number of clock cycles (illustrated by the ellipsis between clock cycle 3 and clock cycle N). In the embodiment of FIG. 1, in which the data bus is independently arbitrated for by the responding agent (the snooping agent, in this case), the snooping agent controls when the data is supplied. Thus, the snooping agent may provide an indication of exclusive, shared, or invalid quickly but defer indicating if the exclusive indication is either the exclusive state or the modified state. Therefore, the snooping agent may defer determining if the data is exclusive or modified. This may allow for flexibility in the snooping agent. For example, in processor 12A or 12B, the data may actually be exclusive at the time of snooping, but an in-flight store may modify the data before the data is fetched from the data cache to be provided in the data phase of the transaction. The in-flight store may be allowed to complete in this case, since the data is in the exclusive state. The subsequent fetching of the data from the data cache then fetches the data in the modified state, and indicates modified during the data phase. Thus, the operation to fetch the data from the data cache (and change the data cache's state) may be performed in a less intrusive way that might be more complex to implement if the exclusive or modified state was identified in the response phase.

In one embodiment, agents driving a signal during a clock cycle drive the signal responsive to the rising edge of the clock signal in that clock cycle. Agents receiving the signal sample the signal on the falling edge of the clock signal. Accordingly, a snooping agent in this embodiment samples the address on the falling edge of the CLK clock signal in clock cycle 1 and drives response signals in clock cycle 3. In other words, the snooping agent has 1½ clock cycles of the CLK clock to determine the snoop response. Other embodiments may specify different delays from the response phase to the address phase, including longer and shorter delays than those shown.

In one embodiment, bus 24 is pipelined. Thus, a second agent may win arbitration in clock cycle 1 to perform a second transaction, present an address phase of the second transaction in clock cycle 2, and have a response phase of the second transaction in a clock cycle succeeding clock cycle 3. Similarly, a third agent may win arbitration in clock cycle 2 to perform a third transaction, etc. In one embodiment, to simplify the coherency protocol, agents initiating a transaction are prohibited from initiating a transaction to the same cache line as a currently outstanding transaction which has not reached its response phase. Thus, for example, the second transaction and third transaction referred to above may not be to the cache line affected by the illustrated transaction. The more rapidly the response is provided, the more rapidly the next transaction affecting that cache line may be initiated. Other embodiments may allow initiation of transactions to the same cache line prior to the response phase of a transaction. The requesting agent of the first transaction may receive its response phase and determine the response for the next requesting agent from the response. Even in such an embodiment, it may be desirable for the response phase to be rapid to minimize complexity and the latency of each transaction.

It is noted that the present discussion refers to the assertion and deassertion of various signals. The assertion of a signal transmits a first piece of information (e.g. shared for the R_SHD[5:0] signals, exclusive for the R_EXC[5:0] signals, or modified for the D_Mod signal). The deassertion of the signal does not transmit the first piece of information. The deassertion may transmit a second piece of information (e.g. exclusive for the D_Mod signal). A signal may be defined to be asserted in either the high state or the low state, according to design choice, and the signal may be deasserted in the other state. Additionally, the signals may be differential and either a positive or a negative difference may be defined to be asserted and the other difference to be deasserted. Furthermore, while a modified signal (D_Mod) is defined in the illustrated embodiment, an exclusive signal (D_Exc) could also be used, asserted if the data is exclusive and deasserted if the data is modified.

Figure 3:
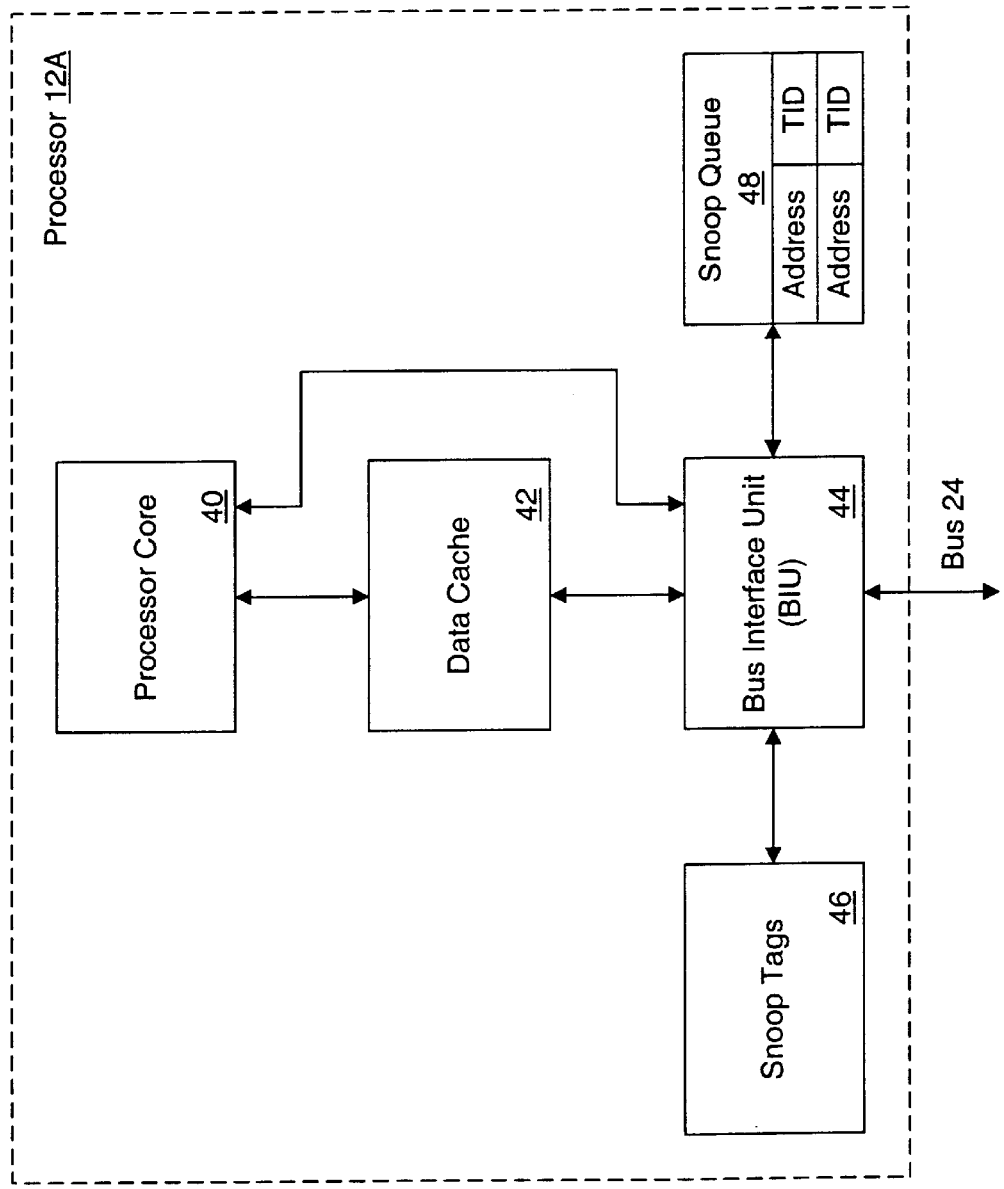
FIG. 3 is a block diagram of one embodiment of a processor shown in FIGS. 1 and 2.

Turning now to FIG. 3, a block diagram of one embodiment of processor 12A is shown. Other embodiments are possible and contemplated. Processor 12B may be similar. In the embodiment of FIG. 3, processor 12A includes a processor core 40, a data cache 42, a bus interface unit (BIU) 44, a snoop tags 46, and a snoop queue 48. Processor core 40 is coupled to BIU 44 and to data cache 42, which is further coupled to BIU 44. BIU 44 is further coupled to snoop tags 46, snoop queue 48, and bus 24.

Generally, BIU 44 comprises circuitry for interfacing processor 12A to bus 24, including circuitry for handling the coherency aspects of bus 24. More particularly for the illustrated embodiment, BIU 44 may capture transaction information corresponding to coherent transactions into snoop queue 48. For example, the address and the transaction identifier may be captured as illustrated in FIG. 3. Additional information may be captured as well, such as the type of transaction. BIU 44 may access snoop tags 46 to provide a snoop response during the response phase of each transaction in snoop queue 48, and may provide a snoop operation to processor core 40 for insertion into the pipeline or pipelines which access data cache 42. The snoop operation may be used to change state in data cache 42 and/or to fetch data from data cache 42 for transmission on bus 24.

Data cache 42 may be a high speed storage for storing cache lines and tag information including the address of the cache line and a state of the cache line. Snoop tags 46 may be a storage for storing tag information corresponding to data cached in data cache 42, including the addresses corresponding to each cache line in data cache 42 and a state of the cache line. However, snoop tags 46 may not track the entire state used by data cache 42 (e.g. the MESI state). In one embodiment, for example, snoop tags 46 may track the exclusive (E), shared (S), and invalid (I) states but not the modified (M) state. Transitions between the E, S, and I states generally involve a transaction on bus 24 while transitions from the E state to the M state may be performed without a bus transaction. Since snoop tags 46 does not track the M state (using its E state to represent both the M state and the E state of data cache 42), snoop tags 46 may be operated at the bus frequency instead of the processor core frequency. For example, in one embodiment the processor core 40 and data cache 42 operate at twice the frequency of bus 24. Other embodiments may use even higher multiples. Therefore, transitions from exclusive to modified (performed in response to a store memory operation by processor core 40 to a cache line in the exclusive state within data cache 42) may occur at two or more times within each bus clock cycle. Thus, tracking the modified state while operating according to the bus clock cycle may be more complex than other states. Tracking the states between which transitions occur in response to bus transactions may simplify the design of snoop tags 46.

While the snoop tags 46 may not exactly track the state of data cache 42 (referred to as being loosely coupled to data cache 42), snoop tags 46 provides enough information for BIU 44 to determine a response for the response phase of the transaction. Thus, processor core 40 and data cache 42 may continue operation unimpeded by snooping unless a snoop hit occurs. In many types of applications, snoop hits are relatively rare. Thus, the interruption of processor core 40 and data cache 42 for coherency purposes may be infrequent. The interruption may occur when a state change is to be performed due to a snoop hit or to fetch data to be provided in response to a snoop hit. However, the act of snooping may be relatively frequent, and thus using snoop tags 46 may prevent the interruption of data cache 42 and/or processor core 40 to snoop when no snoop hit is going to be detected. A snoop hit is detected if the address of a transaction for which the snoop is performed is a cache hit in the cache (or other storage, in the case of I/O bridges 18 and 20) of the snooping agent.

Figure 6:
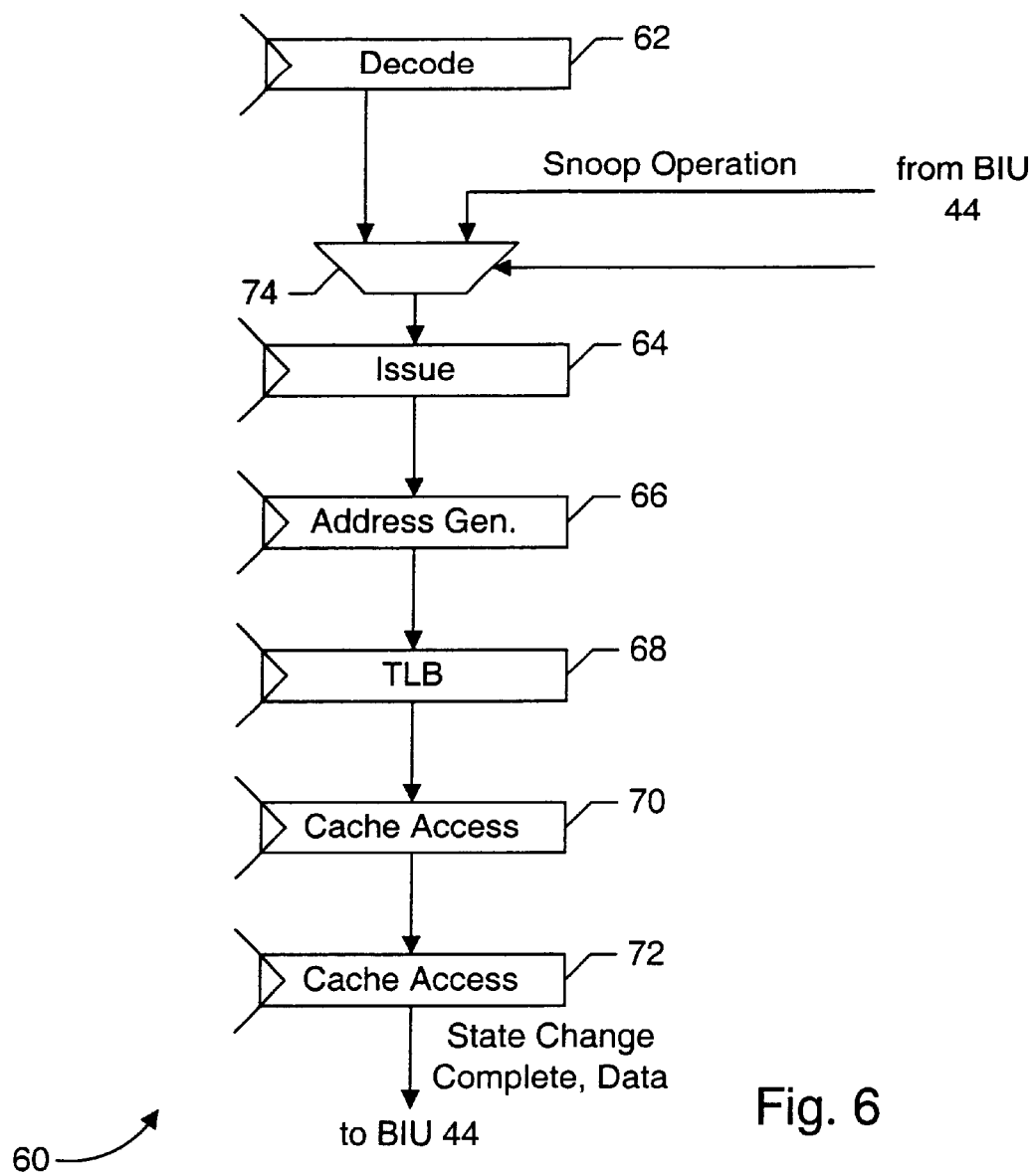
FIG. 6 is a block diagram of an exemplary pipeline which may be employed within one embodiment of the processor shown in FIG. 3.

If BIU 44 detects an exclusive state for a cache line affected by a particular read transaction, BIU 44 may provide a snoop operation to processor core 40 to fetch the data from the cache line in data cache 42. Processor core 40 may insert the snoop transaction at a convenient point in the pipeline which accesses data cache 42. An example is shown in FIG. 6 below. BIU 44 may receive the data from data cache 42 as well as the exclusive or modified state of the data, and may arbitrate for the data bus portion of bus 24. Upon winning the arbitration, BIU 44 may drive the data from data cache 42 as the data for the transaction, and may indicate the exclusive or modified state of the data on the D_Mod signal. The transaction ID for the corresponding transaction in snoop queue 48 may be used as the transaction ID (D_ID[9:0]) for the data phase. The snoop operation which fetches the data may also cause a state change for the data in data cache 42, and the state change may be reflected in snoop tags 46 as well.

Since the snoop operation to fetch the data is inserted at a convenient point in the pipeline, it is possible that stores already in-flight in that pipeline may update the data prior to fetching the data from data cache 42. However, since the response phase indication of exclusive includes the modified state as well, it may be permissible for these stores to be performed prior to fetching the data and providing the data to BIU 44. Coherency of the cache line may still be maintained in this case.

While the present embodiment employs snoop tags 46 for performing snooping, other embodiments may not use snoop tags 46. Instead, data cache 42 may include circuitry for performing a snoop. In such an embodiment, in-flight stores may still be allowed to update an exclusive line after the snoop has taken place, and the exclusive or modified state may be determined when the data is fetched from data cache 42 for transmission on bus 24. In other embodiments, the snoop tags 46 may track the same set of states as data cache 42 (e.g. the MESI states). In such an embodiment, agents may provide a modified indication in the response phase. However, such an embodiment may still allow in-flight stores to update an exclusive line after the snoop has taken place, and the exclusive or modified state may be determined when the data is fetched from data cache 42 for transmission on bus 24 (e.g. on the D_Mod signal) concurrent with the data transfer.

If BIU 44 detects a shared state for a cache line affected by a particular transaction and that transaction indicates an invalidation of the cache line (e.g. a write, a read exclusive, or an invalidate command), BIU 44 may also transmit a snoop operation to processor core 40 for insertion into a pipeline which accesses data cache 42. The operation changes the state in data cache 42 but may not fetch data for transmission on bus 24. Similar to the above case, in-flight stores may continue progress.

As mentioned above, snoop tags 46 stores tag information for each cache line in data cache 42. More particularly, snoop tags 46 may be a storage comprising a plurality of entries, each entry storing tag information corresponding to one cache line of data cache 42. The entries may be organized in the same fashion as data cache 42 (e.g. set associative, direct mapped, fully associative, etc.).

It is noted that providing responses in the response phase for write transactions may be optional. Some embodiments may provide a snoop response for write transactions, and other embodiments many not provide a snoop response for write transactions. However, write transactions may be snooped to cause state updates, as illustrated in FIGS. 4 and 5 below for the ESI and MESI states.

Figure 4:
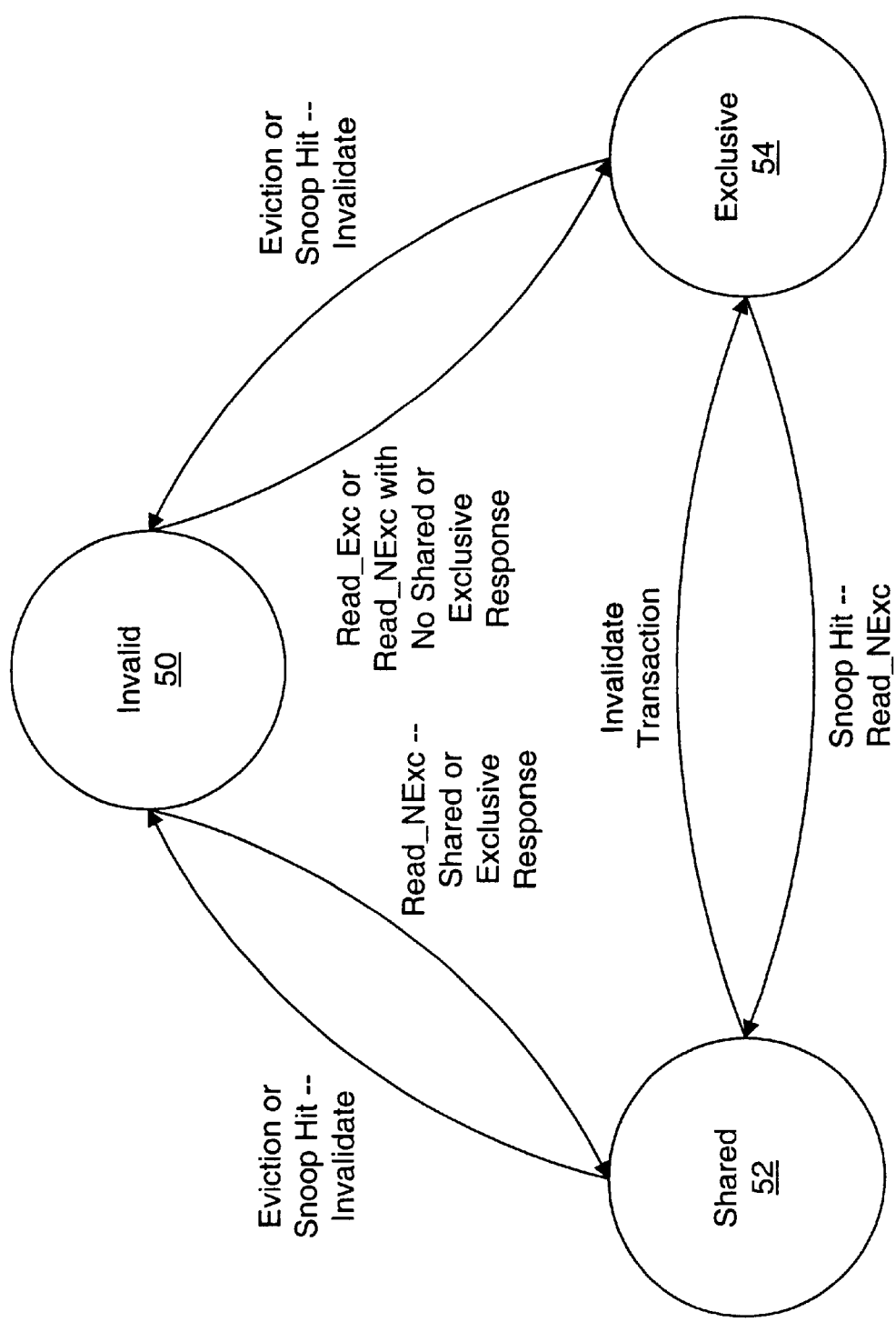
FIG. 4 is a state diagram of a Exclusive, Shared, and Invalid (ESI) coherency protocol.
Figure 5:
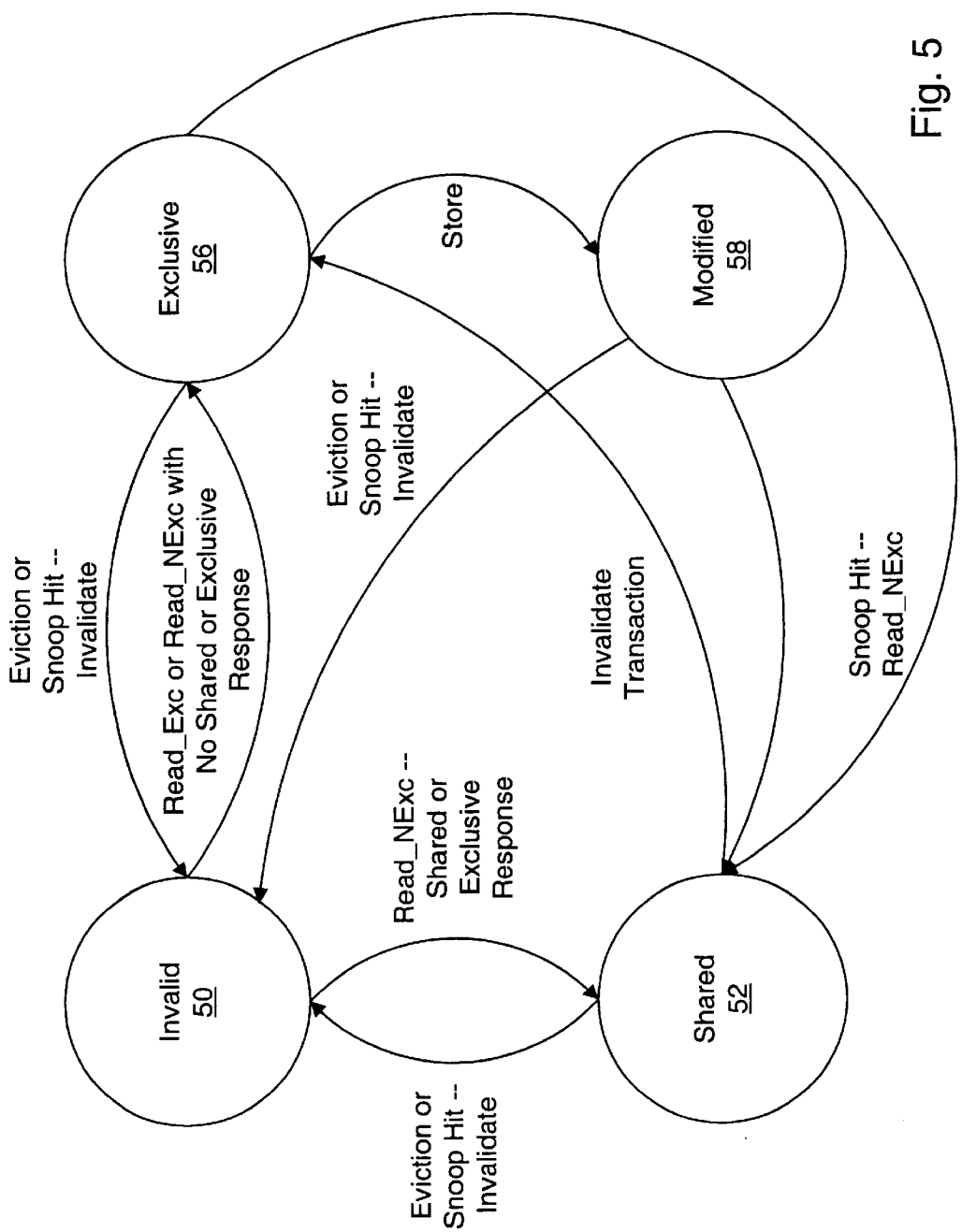
FIG. 5 is a state diagram of a Modified, Exclusive, Shared, and Invalid (MESI) coherency protocol.

Turning next to FIG. 4, a state diagram illustrating the ESI states which may be tracked by one embodiment of snoop tags 46 under control of BIU 44 is shown. Other embodiments are possible and contemplated. In the embodiment of FIG. 4, the invalid (I) state 50, the shared (S) state 52, and the exclusive (E) state 54 are illustrated. The transitions between each state are illustrated as well.

BIU 44 may change the state of a cache line from the invalid state 50 to the shared state 52 if processor core 40 executes a load to the cache line (which misses data cache 42 since the cache line is invalid and results in BIU 44 performing a read non-exclusive transaction to the cache line) and either the shared or the exclusive response is received from a snooping agent by BIU 44 during the response phase of the read non-exclusive transaction. BIU 44 may change the state of the cache line from the shared state 52 to the invalid state 50 responsive to an eviction of the cache line from data cache 42 in response to a line fill of another cache line or in response to a snoop hit causing an invalidation (e.g. a snoop hit due to a write transaction, an invalidate command, or a read exclusive transaction initiated by another agent).

BIU 44 may change the state of the cache line from the invalid state to the exclusive state responsive to performing a read exclusive transaction on bus 24 (which results from, e.g., processor core 40 performing a store miss to data cache 42) or responsive to performing a read non-exclusive transaction (for, e.g., a load miss by processor core 40) which receives no shared or exclusive response in its response phase. BIU 44 may change the state of the cache line from the exclusive state 54 to the invalid state 50 similar to a transition from the shared state 52 to the invalid state 50.

BIU 44 may change the state of the cache line from the shared state 52 to the exclusive state 54 responsive to successfully performing an invalidate transaction on bus 24 in response to the processor attempting to perform a store to the cache line. BIU 44 may change the state of the cache line from the exclusive state 54 to the shared state 52 responsive to a snoop hit by a read non-exclusive transaction initiated by another agent.

While the above description refers to BIU 44 changing the state of a cache line in snoop tags 46, it is noted that snoop tags 46 may include the circuitry for changing states.

Turning next to FIG. 5, a state diagram illustrating the MESI states which may be tracked by one embodiment of data cache 42 is shown. Other embodiments are possible and contemplated. In the embodiment of FIG. 5, the invalid (I) state 50, the shared (S) state 52, the exclusive (E) state 56, and the modified (M) state 58 are illustrated. The transitions between each state are illustrated as well.

The invalid state 50 and the shared state 52 may have the same meaning as similarly shown states in FIG. 4. However, the exclusive state 54 shown in FIG. 4 may represent both the exclusive state 56 and the modified state 58 illustrated in FIG. 5. The transitions between the invalid state 50 and the shared state 52 and between the invalid state 50 and the exclusive state 56 may be the same as those shown in FIG. 4 and thus are not described again with respect to FIG. 5. Additionally, data cache 42 may transition a cache line from modified state 58 to invalid state 50 in a manner similar to the transition of shared state 52 or exclusive state 56 to invalid state 50.

Data cache 42 may transition a cache line from the shared state 52 to the exclusive state 56 responsive to a successful invalidate transaction on bus 24 by BIU 44 in response to a store to the cache line. This transition may be accompanied by a transition in snoop tags 46 to exclusive state 54 as illustrated in FIG. 4. Data cache 42 may subsequently transition a cache line from the exclusive state 56 to modified state 58 responsive to the store updating the cache line.

Data cache 42 may transition a cache line from either the exclusive state 56 or the modified state 58 to the shared state 52 responsive to a snoop hit for a read non-exclusive transaction initiated by another agent. This transition may be accompanied by a transition in snoop tags 46 from exclusive state 54 to shared state 52 as illustrated in FIG. 4.

Data cache 42 may transition a cache line from exclusive state 56 to modified state 58 in response to a store to the cache line. Snoop tags 46 may not be modified during this transition, thus remaining in the exclusive state 54 as illustrated in FIG. 4.

It is noted that the transition from invalid state 50 to exclusive state 56 for a read exclusive by BIU 44 for a store miss to data cache 42 may instead be a direct transition from invalid state 50 to modified state 58. Such a transition may be performed, for example, if the store data is merged into the line fill data as it is written to data cache 42.

It is noted that transitions shown in FIG. 5 resulting from snoop operations may be performed, in one embodiment, in response to snoop operations inserted into a cache access pipeline responsive to a snoop hit.

It is noted that the invalid state shown in FIGS. 4 and 5 may represent a tag which is stored in data cache 42 and snoop tags 46 in the invalid state or a tag which misses in data cache 42 and snoop tags 46. Thus, for example, a transition to the invalid state for a cache line in response to a line fill may physically be a replacement of the tag in data cache 42 and snoop tags 46 with a different tag and a different state.

Turning next to FIG. 6, an exemplary pipeline 60 which may be part of one embodiment of processor core 40 is shown. Other embodiments are possible and contemplated. In the embodiment of FIG. 6, pipeline 60 includes a decode state 62, an issue state 64, an address generation stage 66, a translation lookaside buffer (TLB) state 68, and a pair of cache access stages 70 and 72. A mux 74 is inserted between decode stage 62 and issue stage 64, and a snoop operation may be input to mux 74 by BIU 44. BIU 44 may also provide a selection control to mux 74.

Generally, memory access instructions such as loads and stores may be decoded in decode state 62 and may flow through stages 64–72 for execution. In issue stage 64, the memory access instructions may be selected for execution and issued to address generation stage 66. In address generation state 66, the operands of the memory access instructions are added to generate a virtual address of the data to be read or written. The virtual address may be presented to a TLB in TLB state 68 for translation to a physical address, which may be presented to the data cache 42 for access in stages 70 and 72. Thus, stages 70 and 72 may be coupled to data cache 42.

If a snoop operation is initiated by BIU 44, the snoop operation may be inserted into pipeline 60 at the issue stage 64. BIU 44 may provide the operation to mux 74 and select the operation through mux 74 as a selection control. The selection control may also act as a stall signal for the decode stage 62, if an instruction is being decoded, since the instruction may not pass through mux 74 to the issue stage 64 if the select signal causes the operation from BIU 44 to be selected. The issue stage may be a convenient point for insertion in pipeline 60 since it is the beginning of execution of instructions. The snoop operation may be treated like an instruction by the remaining pipeline stages. Thus, the snoop operation may perform its state change to data cache 42 and/or retrieve data from data cache 42 in the cache access stages 70 and 72. The snoop operation includes its address, and thus the address generation stage may add zero to the address and the address is physical, so it may not be translated by the TLB. Other embodiments may have pipelines having fewer or greater numbers of stages, according to design choice. Furthermore, other embodiments may insert the operation from BIU 44 at other stages of the pipeline, as desired.

Once the operation reaches the end of pipeline 60, the state change is complete in data cache 42 and the data (and its state) is available for BIU 44 (if applicable). This information may be passed from data cache 42 to BIU 44. BIU 44 may update snoop tags 46 and provide the data (and its state) on bus 24.

Figure 7:
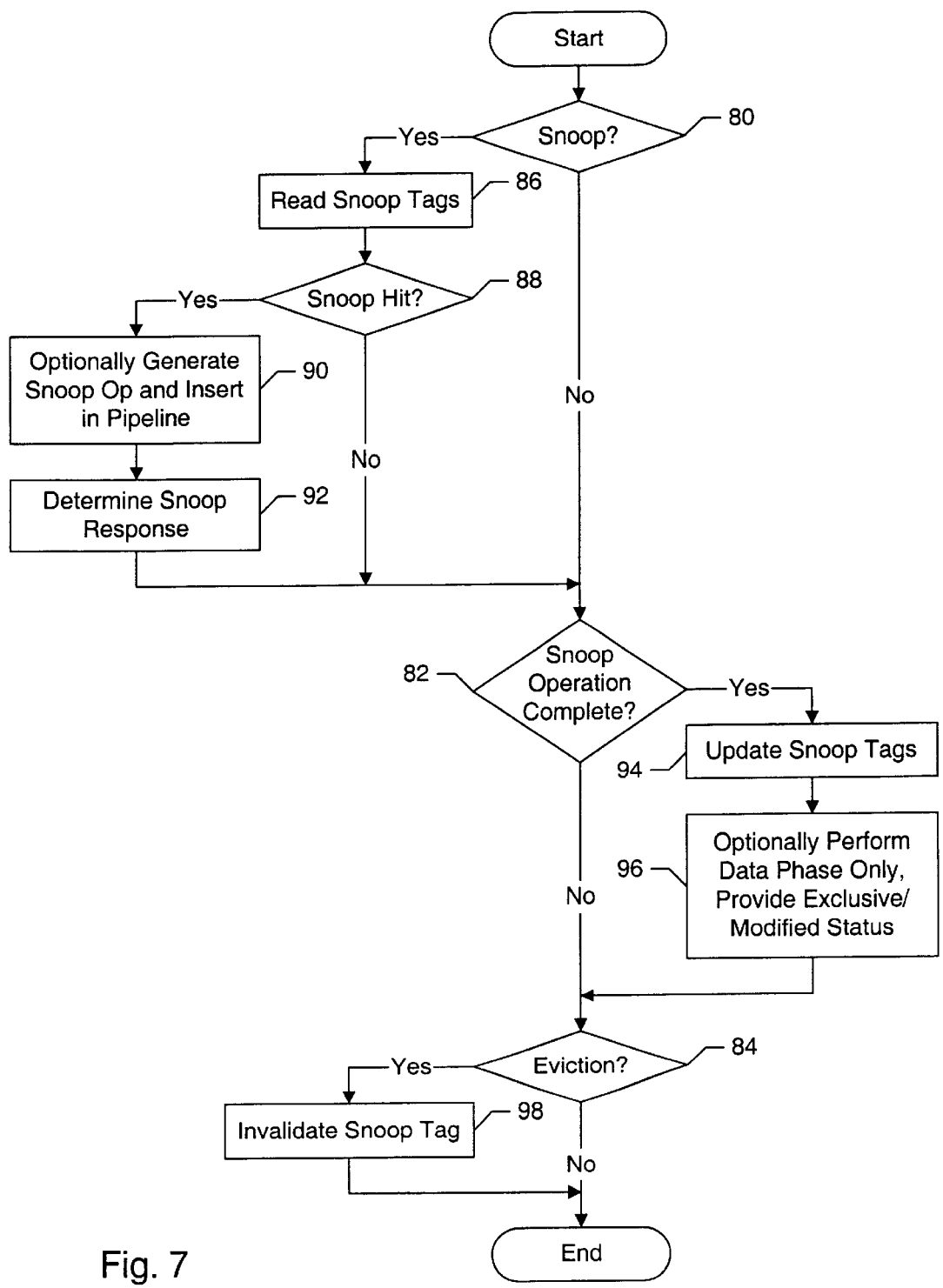
FIG. 7 is a flowchart illustrating operation of one embodiment of a bus interface unit shown in FIG. 3.

Turning now to FIG. 7, a flowchart is shown illustrating operation of one embodiment of BIU 44 with respect to snooping operations. Other embodiments are possible and contemplated. While the blocks illustrated in FIG. 7 are shown in a particular order for ease of understanding, any suitable order may be used. Furthermore, each of decision blocks 80, 82, and 84 may represent independent blocks of circuitry which may operate in parallel. Other blocks may be performed in parallel as well in the combinatorial logic circuitry of BIU 44. Furthermore, various blocks may be performed in different clock cycles according to the bus protocol and design choice within BIU 44.

If there is a snoop operation in snoop queue 48 (decision block 80), BIU 44 reads the snoop tags 46 (block 86). If the address of the transaction being snooped is a snoop hit (decision block 88), BIU 44 may optionally (if a state change is to be performed for the affected cache line or a data fetch from data cache 42 is to be performed) generate a snoop operation and insert it into pipeline 60 (block 90). Additionally, BIU 44 may determine the response based on the snoop hit information for transmission during the response phase of the transaction (block 92). If the address of the transaction being snooped is not a snoop hit, the snoop response is invalid.

If a snoop operation is completing in pipeline 60 (decision block 82), BIU 44 may update snoop tags 46 to reflect the new state of the cache line (thus remaining consistent with data cache 42) (block 94). Additionally, if data was fetched from data cache 42 for transmission on bus 24, BIU 44 may capture the data for transmission on bus 24 and may arbitrate for the data bus and perform the data phase of the transaction (block 96). BIU 44 may provide the exclusive or modified state of the line from data cache 42 as well, using the D_Mod signal. Finally, if data cache 42 evicts a cache line (e.g. due to a line fill of another cache line) (decision block 84), BIU 44 may invalidate the corresponding tag in snoop tags 46 (block 98). If the evicted block is modified, BIU 44 may perform a write transaction to write the evicted block back to the memory system.

Figure 8:
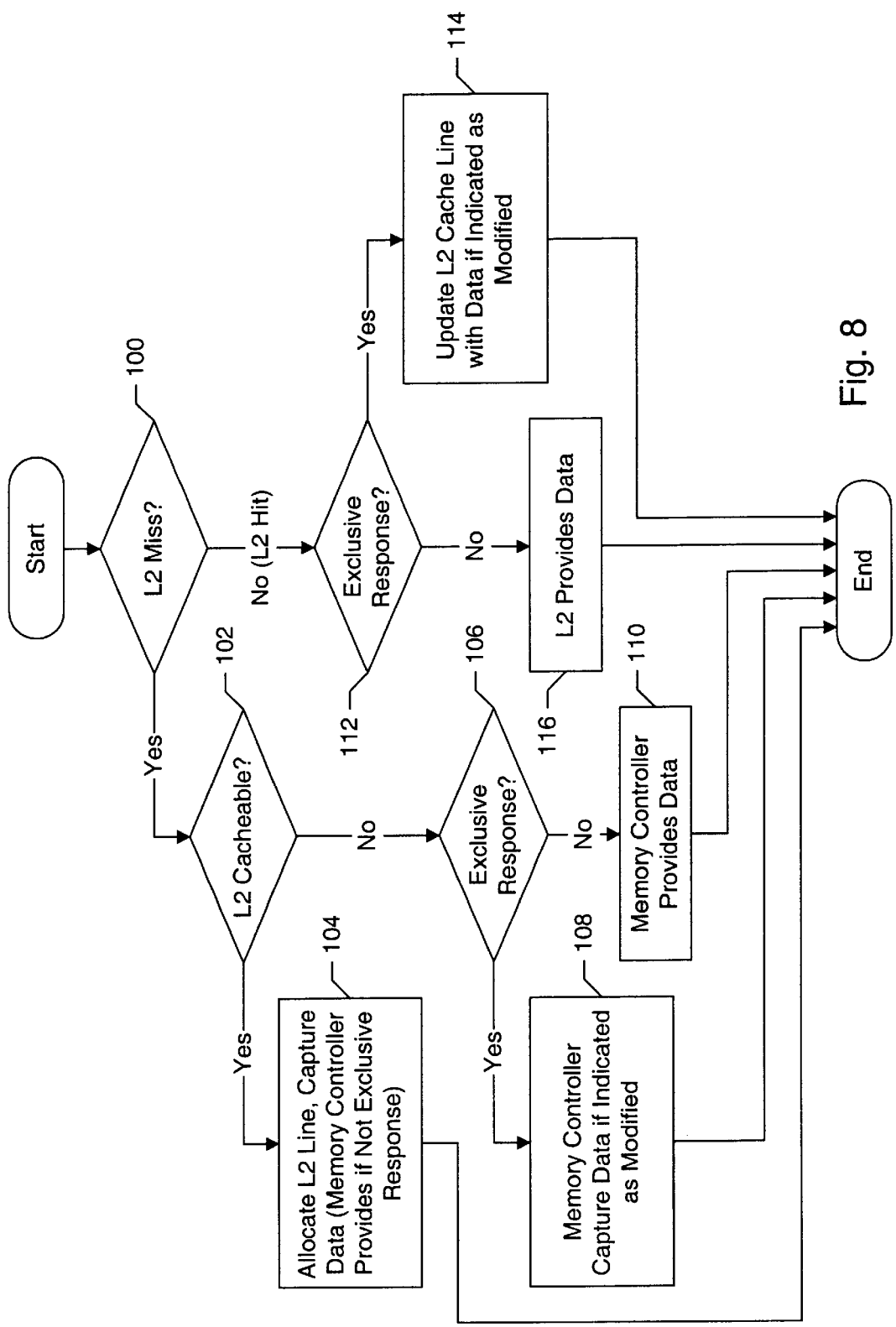
FIG. 8 is a flowchart illustrating operation of one embodiment of a memory system including an L2 cache and a memory controller shown in FIG. 1.

Turning next to FIG. 8, a flowchart illustrating operation of one embodiment of the memory system for a read transaction is shown. Other embodiments are possible and contemplated. While the blocks illustrated in FIG. 8 are illustrated in a particular order for ease of understanding, any suitable order may be used. Furthermore, blocks may be performed in parallel by various circuitry in the memory system. Still further, various blocks may be performed in different clock cycles according to the bus protocol and design choice within the memory system.

If the transaction is a miss in L2 cache 14 (decision block 100), the memory system determines if the transaction is cacheable in L2 cache 14 (decision block 102). In one embodiment, a signal in the address phase of the transaction may indicate whether or not the transaction is L2 cacheable. Other embodiments may define L2 cacheability in other ways. If the transaction is L2 cacheable, L2 cache 14 may allocate an L2 cache line for the data and may capture the data during the data phase (block 104). Memory controller 16 may read the data from memory and provide the data if the exclusive response is not given during the response phase of the transaction.

If the transaction is not L2 cacheable (decision block 102), memory controller 16 may determine if the response phase includes the exclusive response (decision block 106). If the exclusive response is received, the memory controller 16 may capture the data if the data phase indicates the data is modified (block 108) for update into memory 26. Alternatively, the receiving agent may receive the data as modified, if desired. If the data is not modified, memory controller 16 may not update memory 26. If the exclusive response is not received, memory controller 16 may provide the data from memory 26 in the data phase of the transaction (block 110).

If the transaction is an L2 cache hit (decision block 100), L2 cache 14 determines if the exclusive response is received in the response phase of the transaction (decision block 112). If the exclusive response is not received, L2 cache 14 provides the data for the transaction in the data phase (block 116) If the exclusive response is received, L2 cache 14 may update the hitting cache line with the data corresponding to the transaction if the data is indicated as modified in the data phase via the D_Mod signal (block 114). If the data is not indicated as modified, L2 cache 14 may not update the cache line.

It is noted that L2 cache 14 is an optional part of the memory system. A memory system not including L2 cache 14 may be represented by blocks 106, 108, and 110. It is further noted that, for write transactions, the memory system may capture the data irrespective of receiving an exclusive response in the response phase of the write transaction.

Figure 9:
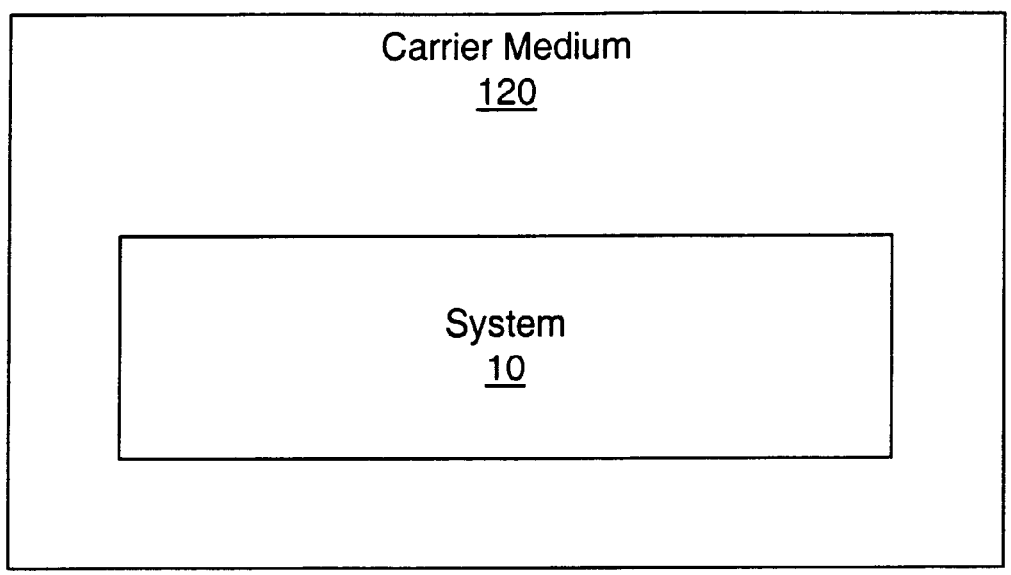
FIG. 9 is a block diagram of one embodiment of a carrier medium carrying a database representing the system shown in FIG. 1.

Turning next to FIG. 9, a block diagram of a carrier medium 120 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 120 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates in a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 120 may be the netlist (with or without the synthesis library) or the data set, as desired.

While carrier medium 120 carries a representation of system 10, other embodiments may carry a representation of any portion of system 10, as desired, including any set of one or more agents (e.g. processors, L2 cache, memory controller, etc.) or circuitry therein (e.g. BIUs, caches, tags, etc.), etc.

Numerous variations and modifications will become apparent to those skilled in the art once the above disclosure is fully appreciated. It is intended that the following claims be interpreted to embrace all such variations and modifications.

What is claimed is:

1. A system comprising:
   a first agent configured to transmit an address of a transaction; and
   a second agent coupled to receive said address, said second agent configured to transmit an indication of a state, within said second agent, of data corresponding to said address, said indication indicating an exclusive state for both said exclusive state and a modified state of said data within said second agent and to respond to the first agent with said indication of the exclusive state, said second agent subsequently to transmit a second indication whether said data is in said exclusive state or said modified state concurrent with providing said data to said first agent.

2. The system as recited in claim 1 wherein said transaction is a read transaction and said second agent is configured to provide said data to said first agent responsive to said second agent indicating exclusive via said indication.

3. The system as recited in claim 2 further comprising a cache, wherein said cache is configured to provide said data responsive to said address hitting in said cache and said indication not indicating said exclusive state.

4. The system as recited in claim 3 further comprising a memory controller, wherein said memory controller is configured to provide said data responsive to said address missing in said cache and said indication not indicating said exclusive state.

5. The system as recited in claim 1 further comprising a cache coupled to receive said second indication, wherein said cache is configured to update a cache line storing said data responsive to said address hitting in said cache and said second indication indicating that said data is in said modified state.

6. The system as recited in claim 5 further comprising a memory controller coupled to receive said second indication, wherein said memory controller is configured to update a memory to which said memory controller is coupled with said data responsive to said address missing in said cache, said address being noncacheable, and said second indication indicating that said data is in said modified state.

7. The system as recited in claim 6 wherein said cache and said memory controller do not update with said data responsive to said second indication indicates that said data is in said exclusive state.

8. The system as recited in claim 5 further comprising a memory controller coupled to receive said second indication, wherein said memory controller is configured to update a memory to which said memory controller is coupled with said data responsive to said address missing in said cache, said address being not cacheable in said cache, and said second indication indicating that said data is in said modified state.

9. The system as recited in claim 1 wherein said second agent comprises a cache and a snoop tags storage, wherein said snoop tags storage is configured to maintain said exclusive state even if corresponding data is modified, and wherein said second agent is configured to snoop said snoop tags storage in response to said address, and wherein said cache is configured to maintain a modified state and an exclusive state if said data is held exclusively, depending on whether or not said data is modified.

10. The system as recited in claim 9 wherein said second agent further comprises a pipeline, wherein a first stage of said pipeline is coupled to said cache, and wherein said second agent is configured to insert an operation to fetch said data from said cache in a second stage of said pipeline prior to said first stage in response to said snoop tags indicating said exclusive state for said data.

11. The system as recited in claim 10 wherein said cache is configured to update to a new state for said data responsive to said operation being in said first stage.

12. The system as recited in claim 11 wherein said snoop tags are updated to said new state for said data responsive to said operation being in said first stage.

13. The system as recited in claim 1 further comprising a memory controller coupled to receive said second indication, wherein said memory controller is configured to update a memory to which said memory controller is coupled with said data responsive to said address missing in a cache, said address being not cacheable in said cache, and said second indication indicating that said data is in said modified state.

14. The system as recited in claim 13 further comprising said cache coupled to receive said second indication, wherein said cache is configured to update a cache line storing said data responsive to said address hitting in said cache and said second indication indicating that said data is in said modified state.

15. The system as recited in claim 2 further comprising a memory controller, wherein said memory controller is configured to provide said data responsive to said address missing in a cache and said indication not indicating said exclusive state.

16. The system as recited in claim 15 further comprising said cache, wherein said cache is configured to provide said data responsive to said address hitting in said cache and said indication not indicating said exclusive state.

17. An agent comprising:
a storage configured to store state information indicative of a state of data stored within said agent; and
a circuit coupled to said storage and to receive an address of a transaction, wherein said circuit is configured to generate an indication of a state of data corresponding to said address responsive to said state information in said storage, said indication indicating an exclusive state for both an exclusive state within said agent and a modified state within said agent and to respond to the transaction with said indication of the exclusive state, said agent subsequently to provide a second indication whether said data is in said exclusive state or said modified state concurrent with providing said data in response to the transaction.

18. The agent as recited in claim 17 wherein said storage comprises a snoop tags storage, and wherein said state information in said snoop tags storage is not updated in response to said agent modifying said data.

19. The agent as recited in claim 18 further comprising a pipeline and a data cache, wherein a first stage of said pipeline is coupled to said data cache, and wherein said agent is configured to insert an operation to fetch said data from said data cache in a second stage of said pipeline prior to said first stage in response to said snoop tags indicating said exclusive state for said data and said transaction being a read transaction.

20. The agent as recited in claim 19 wherein said data cache is configured to update to a new state for said data responsive to said operation being in said first stage.

21. The agent as recited in claim 20 wherein said snoop tags are updated to said new state for said data responsive to said operation being in said first stage.

22. A method comprising:
receiving an address of a transaction in an agent; and
responding from said agent during a response phase of said transaction with an exclusive state for both said exclusive state and a modified state of data corresponding to said address within said agent, but said agent subsequently responding with a second indication, whether said data is in said exclusive state or said modified state, concurrent with providing said data in response to the transaction.

23. The method as recited in claim 22 further comprising transmitting data from said agent for said transaction if said transaction is a read transaction.

24. The method as recited in claim 22 further comprising storing said data in a cache responsive to said address hitting in said cache and transmitting said second indication.

25. The method as recited in claim 22 further comprising storing said data in a memory responsive to said address missing in said cache, being non-cacheable, and transmitting said second indication.

26. The method as recited in claim 22 further comprising storing said data in a memory responsive to said address missing in said cache, being not cacheable in said cache, and transmitting said second indication.

27. A carrier medium comprising a database which is operated upon by a program executable on a computer system, the program operating on the database to perform a portion of a process to fabricate an integrated circuit including circuitry described by the database, the circuitry described in the database including:
   a first agent configured to transmit an address of a transaction; and
   a second agent coupled to receive said address, said second agent configured to transmit an indication of a state, within said second agent, of data corresponding to said address, said indication indicating an exclusive state for both said exclusive state and a modified state of said data within said second agent and to respond to the first agent with said indication of the exclusive state, said second agent subsequently to transmit a second indication whether said data is in said exclusive state or said modified state concurrent with providing said data to said first agent.

28. The carrier medium as recited in claim 27 wherein said transaction is a read transaction and said second agent is configured to provide said data to said first agent responsive to said second agent indicating exclusive via said indication.

29. The carrier medium as recited in claim 28 wherein said circuitry further comprises a cache, and wherein said cache is configured to provide said data responsive to said address hitting in said cache and said indication not indicating said exclusive state.

30. The carrier medium as recited in claim 29 wherein said circuitry further comprises a memory controller, wherein said memory controller is configured to provide said data responsive to said address missing in said cache and said indication not indicating said exclusive state.

31. The carrier medium as recited in claim 27 wherein said circuitry further comprises a cache coupled to receive said second indication, wherein said cache is configured to update a cache line storing said data responsive to said address hitting in said cache and said second indication indicating that said data is in said modified state.

32. The carrier medium as recited in claim 31 wherein said circuitry further comprises a memory controller coupled to receive said second indication, wherein said memory controller is configured to update a memory to which said memory controller is coupled with said data responsive to said address missing in said cache, said address being noncacheable, and said second indication indicating that said data is in said modified state.

33. The carrier medium as recited in claim 32 wherein said cache and said memory controller do not update with said data responsive to said second indication indicates that said data is in said exclusive state.

34. The carrier medium as recited in claim 21 wherein said second agent comprises a cache and a snoop tags storage, wherein said snoop tags storage is configured to maintain said exclusive state even if corresponding data is modified, and wherein said second agent is configured to snoop said snoop tags storage in response to said address, and wherein said cache is configured to maintain a modified state and an exclusive state if said data is held exclusively, depending on whether or not said data is modified.

35. The carrier medium as recited in claim 34 wherein said second agent further comprises a pipeline, wherein a first stage of said pipeline is coupled to said cache, and wherein said second agent is configured to insert an operation to fetch said data from said cache in a second stage of said pipeline prior to said first stage in response to said snoop tags indicating said exclusive state for said data.

36. The carrier medium as recited in claim 35 wherein said cache is configured to update to a new state for said data responsive to said operation being in said first stage.

37. The carrier medium as recited in claim 36 wherein said snoop tags are updated to said new state for said data responsive to said operation being in said first stage.

38. A carrier medium comprising a database which is operated upon by a program executable on a computer system, the program operating on the database to perform a portion of a process to fabricate an integrated circuit including circuitry described by the database, the circuitry described in the database including an agent comprising:
   a storage configured to store state information indicative of a state of data stored within said agent; and
   a circuit coupled to said storage and to receive an address of a transaction, wherein said circuit is configured to generate an indication of a state of data corresponding to said address responsive to said state information in said storage, said indication indicating an exclusive state for both an exclusive state within said agent and a modified state within said agent and to respond to the transaction with said indication of the exclusive state, said agent subsequently to provide a second indication whether said data is in said exclusive state or said modified state concurrent with providing said data in response to the transaction.

39. The carrier medium as recited in claim 38 wherein said storage comprises a snoop tags storage, and wherein said state information in said snoop tags storage is not updated in response to said agent modifying said data.

40. The carrier medium as recited in claim 39 wherein the agent further comprising a pipeline and a data cache, wherein a first stage of said pipeline is coupled to said data cache, and wherein said agent is configured to insert an operation to fetch said data from said data cache in a second stage of said pipeline prior to said first stage in response to said snoop tags indicating said exclusive state for said data and said transaction being a read transaction.

41. The carrier medium as recited in claim 40 wherein said data cache is configured to update to a new state for said data responsive to said operation being in said first stage.

42. The carrier medium as recited in claim 41 wherein said snoop tags are updated to said new state for said data responsive to said operation being in said first stage.

* * * * *